United States Patent [19]

Dorsch

[11] Patent Number: 4,626,170

[45] Date of Patent: Dec. 2, 1986

[54] PROPULSION AGGREGATE FOR AN AIRCRAFT

[75] Inventor: Heinz Dorsch, Weissach-Flacht, Fed. Rep. of Germany

[73] Assignee: Dr. Ing. h.c.F. Porsche AG, Stuttgart, Fed. Rep. of Germany

[21] Appl. No.: 577,255

[22] Filed: Feb. 6, 1984

[30] Foreign Application Priority Data

Feb. 25, 1983 [DE] Fed. Rep. of Germany ....... 3306612

[51] Int. Cl.⁴ ............................................. B64C 11/34

[52] U.S. Cl. ......................................... 416/29; 416/30

[58] Field of Search ....................... 416/29, 25, 27, 30, 416/28

[56] References Cited

U.S. PATENT DOCUMENTS

| | | | |
|---|---|---|---|
| 2,476,063 | 7/1949 | Ridgley et al. | 416/29 X |
| 2,480,758 | 8/1949 | Mock et al. | 416/29 X |
| 2,485,431 | 10/1949 | Chudyk | 416/29 |
| 2,486,212 | 10/1949 | Schorn et al. | 416/29 |
| 2,521,244 | 9/1950 | Moore | 416/29 X |
| 2,612,226 | 9/1952 | Crum | 416/29 |
| 2,727,578 | 12/1955 | Alexanderson et al. | 416/29 |
| 2,818,847 | 1/1958 | Mock | 416/29 X |
| 3,876,329 | 4/1975 | Miller | 416/29 X |

FOREIGN PATENT DOCUMENTS

| | | | |
|---|---|---|---|
| 790123 | 11/1935 | France | 416/29 |
| 490 | 1/1983 | Japan | 416/29 |

*Primary Examiner*—Everette A. Powell, Jr.
*Attorney, Agent, or Firm*—Barnes & Thornburg

[57] ABSTRACT

A propulsion aggregate for an aircraft consisting of a multicylinder-injection internal combustion engine and of a propeller with adjustable blade pitch driven either directly by the engine or by way of a speed reduction gear. The internal combustion engine is equipped with a commercially available continuously operating fuel injection system which for safety reasons and for designing for optimum aircraft operation, is additionally provided with additional control installations. A throttle valve in the suction line of the internal combustion engine, the blade pitch of the propeller and, in case the internal combustion engine is charged by a turbocharger, also the charging pressure are adjustable by a common adjusting mechanism.

20 Claims, 2 Drawing Figures

PROPULSION AGGREGATE FOR AN AIRCRAFT

Figure 1:
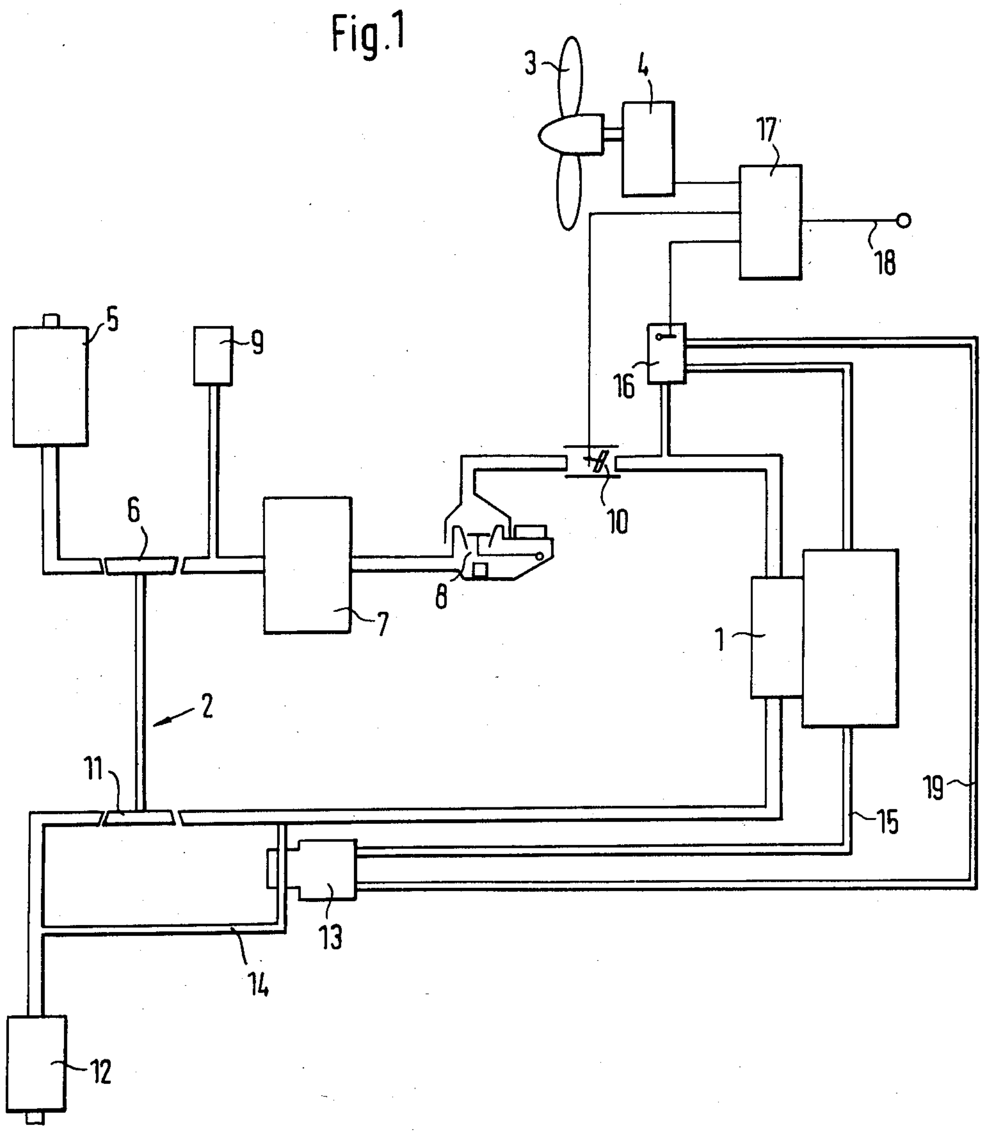

The present invention relates to a propulsion aggregate for an aircraft with a multicylinder-injection internal combustion engine, in the suction pipe of which a throttle valve is installed and whose crankshaft drives either directly or by way of a speed reduction gear a propeller with adjustable blade pitch.

The U.S. Pat. No. 3,876,329 starts with such an aircraft propulsion. The propeller driven by the crankshaft includes a centrifugal governor, by means of which the blade angle of the propeller blades and therewith the load of the internal combustion engine is so adjusted that its rotational speed can be kept at a constant value. The desired or given value of the rotational speed can be changed by means of an output lever engaging in the centrifugal governor. The same output lever actuates the throttle valve of the internal combustion engine as well as a rotary slide member, by means of which the fuel quantity to be injected into the internal combustion engine is controllable. This concept, in which three functions are linked together, requires costly control mechanisms in order to be operable. An optimization of the overall efficiency composed of the propeller efficiency and of the efficiency of the internal combustion engine is not possible because as a result of the mechanical coupling, a respective improvement of the one efficiency entails deterioration of the other efficiency.

The task of the present invention resides in developing an aircraft propulsion with improved overall efficiency and with the requisite thrust at as small as possible a fuel consumption.

The underlying problems are solved according to the present invention in that for the formation of the fuel-air mixture, a fully automatic continuously operating fuel injection system with an air quantity measuring device is provided, which meters to the individual suction pipes of the cylinders a fuel quantity corresponding to the air mass by way of the control piston of a fuel quantity distributor, and in that the throttle valve and the blade pitch of the propeller are adjustable by means of a common adjusting mechanism. The composion of the fuel-air mixture takes place thereby automatically in dependence on the sucked in air mass, i.e. on the output of the internal combustion engine so that a combustion optimum from a consumption point of view is assured. The power output is controlled by the rotational speed of the propeller respectively of the internal combustion engine connected therewith, which is adjustable by changing the blade pitch of the propeller by means of an adjusting mechanism which at the same time actuates the throttle valve. It is achieved thereby that at small outputs one also operates at a small rotational speed; thus, the mechanical friction losses are reduced. Since the throttle valve is always fully opened in the normal output range, i.e. during the start, climbing and traveling, the charge exchange losses are reduced and the required output is achieved without throttling with greatest possible filling of the cylinders. The cooperatin of these favorable influences produces an altogether very high efficiency of the internal combustion engine. The propeller is so designed that it operates with best efficiency, if it is operated with the lowest rotational speed at the respective power input. This is the case during full load operation of the internal combustion engine. As a result of the low rotational speed also the circumferential velocity of the propeller blades becomes small so that the noise development is reduced to a minimum.

In addition to an improvement of the overall efficiency the propulsion aggregate of the present invention offers the advantage that it can be manufactured in a cost favorable manner; for a commercially available K-Jetronic as described in "Bosch, Technische Unterrichtung, 1974" (Bosch Technical Instruction, 1974) can be used as injection installation, which is manufactured as mass produced article and is used in passenger motor vehicles. Appropriately this commercially available injection system is merely completed by the installation of an air density-control pressure regulator in order to enable an adaptation of the mixture composition to the pressures and temperatures of the suction air which vary with flight altitude or with the charging degree.

In an alternative embodiment of the aircraft propulsion according to the present invention the internal combustion engine is charged by an exhaust gas turbocharger connected thereto. In this case, the absolute pressure of the charging air, which is produced by the turbocharger compressor, is regulated in unison with the blade pitch of the propeller; it is correctly adjusted in each case for an operation of the internal combustion engine which is optimum for consumption and output. In the upper output range the power output is controlled by variation of the blade pitch and therewith by variation of the rotational speed. Below about 30% of output, the output control takes place by throttling.

Figure 2:
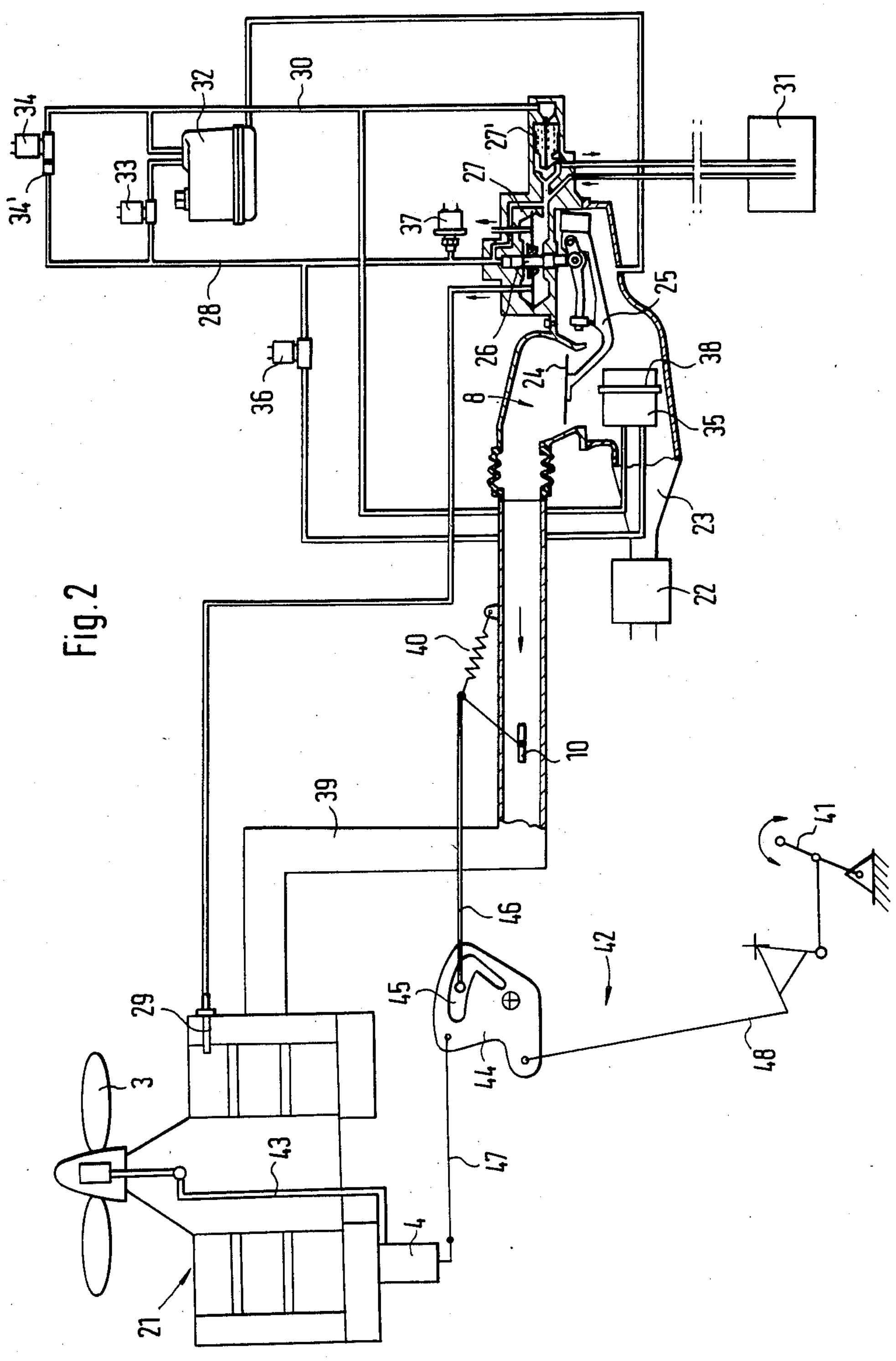

These and other objects, features and advantages of the present invention will become more apparent from the following description when taken in connection with the accompanying drawing which shows, for purposes of illustration only, two embodiments in accordance with the present invention, and wherein:

FIG. 1 is a schematic view of an aircraft propulsion aggregate with a charge multicylinder-injection internal combustion engine and propeller in accordance with the present invention; and FIG. 2 is a schematic view of a modified embodiment of an aircraft propulsion aggregate with injection installation and mechanical adjusting mechanism in accordance with the present invention.

Referring now to the drawing wherein like reference numerals are used throughout the two views to designate like parts, a multicylinder internal combustion engine 1 serves as propulsion aggregate for an aircraft, which is charged by an exhaust gas turbocharger generally designated by reference numeral 2 and drives a propeller 3, whose blade pitch is adjustable by a propeller governor or controller 4. The combustion air enters through an air filter 5, is compressed by a turbocharger compressor 6 and after cooling in the charging air cooler 7 is fed to an air quantity measuring device 8 of a fuel injection installation. The pressure of the charging air is measured by means of a pressure measuring apparatus 9 connected to the charging air line between the turbocharger compressor 6 and the charging air cooler 7. A throttle valve 10 is arranged in the line between the air quantity measuring device 8 and the internal combustion engine 1.

The exhaust gases leaving the internal combustion engine 1 flow through an exhaust gas turbine 11 which drives the turbocharger compressor 6 and then leave into the atmosphere through an exhaust gas muffler 12. The loading of the exhaust gas turbine 11 and therewith the charging pressure produced by the turbo-compressor 6 is controllable by bypass valve 13 which is installed into a bypass line 14 bypassing the exhaust gas turbine 11. For control purposes the bypass valve 13 is connected by means of a control line 15 by way of the internal combustion engine with an absolute pressure control apparatus 16 which is connected to the charging air line between throttle valve 10 and internal combustion engine 1 and additionally is connected to an electronic control apparatus 17. The bypass valve 13 is directly connected by means of a further control line 19 with the absolute pressure control apparatus 16. The throttle valve 10 and the propeller governor 4 are additionally connected also with the electronic control apparatus 17. The position of the throttle valve 10 as well as the blade pitch of the propeller 3 and additionally the pressure of the charging air which is adjustable by means of the absolute pressure control apparatus 16 and of the bypass valve 13, can be adjusted in unison at an adjusting lever 18 of the control apparatus 17.

In lieu of this electronic-hydraulic adjusting installation also a mechanical adjusting installation may be used which is illustrated in FIG. 2. The internal combustion engine 21 illustrated in this figure operates without turbocharger in pure suction operation. The fuel injection installation illustrated in greater detail in FIG. 2 which is used for both embodiments of the present invention, will now be described more fully hereinafter.

Combustion air is sucked into the air quantity measuring device 8 by the pistons of the internal combustion engine 21 by way of an air filter 22 and an air suction line 23. The air quantity measuring device 8 consists of a disk 24 arranged transversely to the flow direction of the air, whose adjusting movement, dependent on the throughflow quantity, is transmitted by way of a rotatably supported lever 25 to one end face of the control piston 26 of a fuel quantity distributor 27 having a control valve 27'. The other end face of the control piston 26 is acted upon by the pressure of a control pressure line 28 which acts as return force for the air quantity measuring device 8. Depending on the position of the control piston 26 more or less fuel is evenly distributed to the injection valves 29, of which one each is coordinated to a respective cylinder of the aircraft engine and is illustrated in the drawing.

When a warm-up controller 32 is installed between the control pressure line 28 and the return line 30 of the fuel to the fuel tank 31, as described in "Bosch, Technische Unterrichtung, Benzineinspritzung K-Jetronic, 28 Fed. 1974, pages 14 and 15." An electromagnetic valve 33 is connected ahead of the warm-up controller 32 which is actuatable automatically or by manual shifting. An electromagnetic valve 34 with a fixed throttle 34' is connected in parallel to the warm-up regulator 32 between the control pressure line 28 and the return line 30 and an air density-control pressure regulator 35 is installed into a further parallel line, which is also adapted to be engaged and disengaged by an electromagnetic valve 36 connected ahead of the regulator 35. The pressure of the control pressure line 28 is monitored by a pressure measuring apparatus 37 connected thereto. The air density-control pressure regulator 35 contains a gas filled diaphragm box 38; it is arranged in the suction pipe directly below the disk 24 of the air quantity measuring device 8 and thus measures the temperature and the pressure of the air sucked in by the turbocharger 1 at the same place, at which also the throughflow quantity is determined by the air quantity measuring device 8.

The throttle valve 10 installed in the suction line 39 leading from the air quantity measuring device 8 to the internal combustion engine 21 is adjustable against the force of a return spring 40 by an adjusting lever 41 to be manually actuated by means of a transmission linkage generally designated by reference numeral 42; the propeller governor 4 which is controllable at the same time by the transmission linkage 42, adjusts the blade pitch of the propeller 3 by way of a hydraulic line 43. The transmission linkage 42 consists of a rotatably supported cam disk 44, in the arcuately shaped track 45 of which a pivot lever 46 is guided that is connected with the throttle valve 10, of a pivot lever 47 between the disk 44 and the propeller regulator 4 as well as of a lever linkage 48 from the cam disk 44 to the adjusting lever 41.

While I have shown and described only two embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A propulsion aggregate for an aircraft utilizing a multicylinder-injection-internal combustion engine having a crankshaft and inlet suction line means for each cylinder, throttle valve means in said inlet suction line means to control the flow of inlet air to the engine, a propeller with an adjustable blade pitch drivingly connected to said crankshaft, a blade pitch control for said propeller, a fully automatic continuously operating fuel injection means for determining a fuel-air mixture for the engine including an air quantity measuring means operable to meter a fuel quantity to the engine in response to air mass flow to the individual suction line means of the cylinders by way of a control piston of a fuel quantity distributor means, and common adjusting means for adjusting both the throttle valve means and the blade pitch control of the propeller in unison.

2. A propulsion aggregate according to claim 1, wherein the multicylinder-internal combustion engine is charged by an exhaust gas turbocharger means and wherein the common adjusting means adjusts the charging pressure produced by the exhaust gas turbocharger means.

3. Propulsion aggregate according to claim 1, wherein the common adjusting means fully opens the throttle valve means during normal flight conditions beginning with a rotational speed of the internal combustion engine of about 2000 rpm.

4. Propulsion aggregate according to claim 3, wherein the normal flight conditions include aircraft starting, climbing and traveling.

5. A propulsion aggregate according to claim 1, further comprising an air density-control pressure regulator sensor means arranged in the air suction line means directly ahead of an air quantity measuring sensor means of the air quantity measuring means, an air density-control pressure regulator means being responsive to said air density-control sensor means and operatively connected to a control pressure line leading to a warm-up regulator means and disposed in parallel to a control pressure line which determines in part the position of the control piston in order to change the control pressure and thus cause the control piston to change the fuel-air mixture formation as a function of the varying sensed density conditions.

6. A propulsion aggregate according to claim 1, wherein the common adjusting means is so constructed that the throttle valve provides for a maximum possible respectively permissive charging pressure is established at all times.

7. A propulsion aggregate according to claim 1, wherein the common adjusting means includes a control means actuated by an adjusting lever and hydraulically actuated adjusting members.

8. A propulsion aggregate according to claim 1, wherein the adjusting means includes an adjusting lever and a mechanical transmission linkage means.

9. A propulsion aggregate according to claim 2, further comprising an air density-control pressure regulator sensor means arranged in the air suction line means directly ahead of an air quantity measuring sensor means of the air quantity measuring means, an air density-control pressure regulator means being responsive to said air density-control sensor means and operatively connected to a control pressure line leading to a warm-up regulator means and disposed in parallel to a control pressure line which determine in part the position of the control piston in order to change the control pressure and thus cause the control piston to change the fuel-air mixture formation as a function of the varying sensed density conditions.

10. A propulsion aggregate according to claim 9, wherein the common adjusting means is so constructed that the throttle valve provides for a maximum possible respectively permissive charging pressure is established at all times.

11. A propulsion aggregate according to claim 10, wherein the common adjusting means includes a control means actuated by an adjusting lever and hydraulically actuated adjusting members.

12. A propulsion aggregate according to claim 10, wherein the adjusting means includes an adjusting lever and a mechanical transmission linkage means.

13. A propulsion aggregate according to claim 2, wherein the common adjusting means is so constructed that the throttle valve provides for a maximum possible respectively permissive charging pressure is established at all times.

14. A propulsion aggregate according to claim 9, wherein the common adjusting means includes a control means actuated by an adjusting lever and hydraulically actuated adjusting members.

15. A propulsion aggregate according to claim 9, wherein the adjusting means includes an adjusting lever and a mechanical transmission linkage means.

16. A propulsion aggregate according to claim 1, wherein the common adjusting means includes a control means actuated by an adjusting lever and electrically actuated adjusting members.

17. A propulsion aggregate according to claim 9, wherein the common adjusting means includes a control means actuated by an adjusting lever and electrically actuated adjusting members.

18. A propulsion aggregate according to claim 10, wherein the common adjusting means includes a control means actuated by an adjusting lever and electrically actuated adjusting members.

19. A propulsion aggregate according to claim 5, wherein the common adjusting means is so constructed that the throttle valve provides for a maximum possible respectively permissive charging pressure is established at all times.

20. A propulsion aggregate according to claim 19, wherein the common adjusting means includes a control means actuated by an adjusting lever and hydraulically actuated adjusting members.

* * * * *